(12) United States Patent
Xu et al.

(10) Patent No.: US 10,846,560 B2
(45) Date of Patent: Nov. 24, 2020

(54) GPU OPTIMIZED AND ONLINE SINGLE GAUSSIAN BASED SKIN LIKELIHOOD ESTIMATION

(71) Applicant: INTEL CORPORATION, Santa Clara, CA (US)

(72) Inventors: Lin Xu, Beijing (CN); Liu Yang, Beijing (CN); Anbang Yao, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 16/080,003

(22) PCT Filed: Mar. 25, 2016

(86) PCT No.: PCT/CN2016/077348
§ 371 (c)(1),
(2) Date: Aug. 25, 2018

(87) PCT Pub. No.: WO2017/161561
PCT Pub. Date: Sep. 28, 2017

(65) Prior Publication Data
US 2019/0065892 A1    Feb. 28, 2019

(51) Int. Cl.
*G06T 7/90* (2017.01)
*G06K 9/62* (2006.01)
(Continued)

(52) U.S. Cl.
CPC ....... *G06K 9/6202* (2013.01); *G06K 9/00234* (2013.01); *G06K 9/4652* (2013.01);
(Continued)

(58) Field of Classification Search
CPC .. G06K 9/6202; G06K 9/4652; G06K 9/6267; G06K 9/00234; G06N 7/005; G06T 7/90; G06T 2207/30088
See application file for complete search history.

(56) References Cited

U.S. PATENT DOCUMENTS 8,331,614 B2   12/2012   Mannerheim et al.
8,406,482 B1    3/2013   Chien et al.
(Continued)

FOREIGN PATENT DOCUMENTS

| CN | 102324025 A | 1/2012 |
| CN | 105869459 A | 8/2016 |
| KR | 100695174 B1 | 3/2007 |

OTHER PUBLICATIONS

International Search Report and Written Opinion for PCT Application Serial No. PCT/CN2016/077348 filed Mar. 25, 2016 dated Jan. 5, 2017, 7 pages.

*Primary Examiner* — Chuong A Ngo
(74) *Attorney, Agent, or Firm* — Hanley, Flight and Zimmerman, LLC

(57) ABSTRACT

A system for performing single Gaussian skin detection is described herein. The system includes a memory and a processor. The memory is configured to receive image data. The processor is coupled to the memory. The processor is to generate a single Gaussian skin model based on a skin dominant region associated with the image data and a single Gaussian non-skin model based on a second region associated with the image data and to classify individual pixels associated with the image data via a discriminative skin likelihood function based on the single Gaussian skin model and the single Gaussian non-skin model to generate skin label data associated with the image data.

25 Claims, 7 Drawing Sheets

(51) Int. Cl.
*G06K 9/00* (2006.01)
*G06K 9/46* (2006.01)
*G06N 7/00* (2006.01)

(52) U.S. Cl.
CPC ........... *G06K 9/6267* (2013.01); *G06N 7/005* (2013.01); *G06T 7/90* (2017.01); *G06T 2207/30088* (2013.01)

(56) References Cited

U.S. PATENT DOCUMENTS

| | | | |
|---|---|---|---|
| 2005/0031173 A1* | 2/2005 | Hwang | G06K 9/00597 382/118 |
| 2007/0230743 A1 | 10/2007 | Mannerheim et al. | |
| 2009/0196475 A1* | 8/2009 | Demirli | G06K 9/00281 382/128 |

* cited by examiner

300

700

GPU OPTIMIZED AND ONLINE SINGLE GAUSSIAN BASED SKIN LIKELIHOOD ESTIMATION

CROSS REFERENCE TO RELATED APPLICATIONS

Pursuant to 35 U.S.C. § 371, this application is the United States National Stage Application of International Patent Application No. PCT/CN2016/077348, filed on Mar. 25, 2016, the contents of which are incorporated by reference as if set forth in their entirety herein.

BACKGROUND

In image processing and computer vision contexts, color based skin detection techniques may be used in a wide range of applications such as digital make up, video based beautification, face tracking, three dimensional face modeling, hand gesture detection and tracking, people retrieval from databases, and the like. Furthermore, such applications are becoming increasingly popular particularly on camera embedded mobile devices such as smart phones, tablets, and the like. Therefore, robust and efficient skin detection technologies may be of increasing importance.

BRIEF DESCRIPTION OF THE FIGURES

The following detailed description may be better understood by referencing the accompanying drawings, which contain specific examples of numerous objects and features of the disclosed subject matter.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
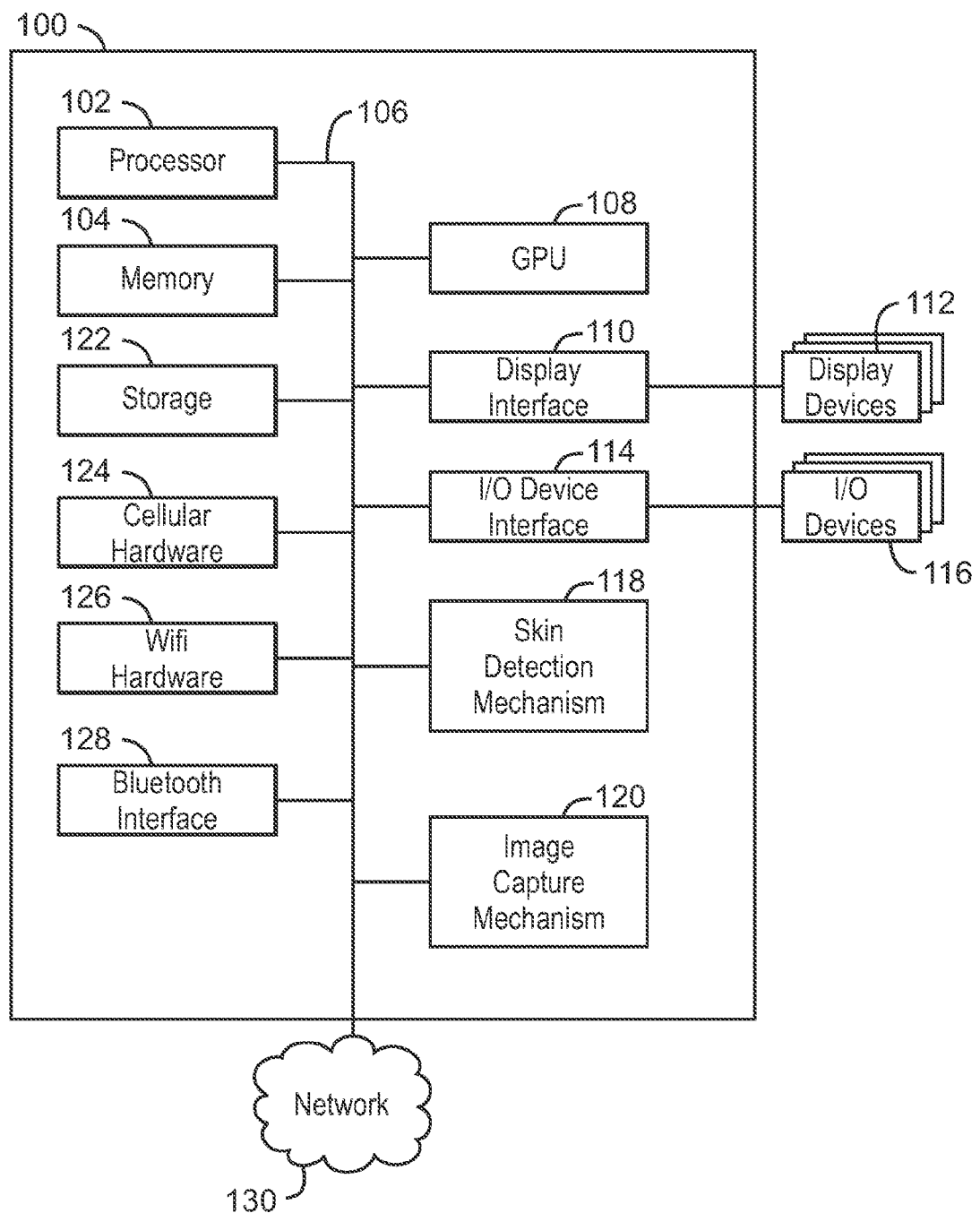
FIG. 1 is a block diagram of an exemplary system that enables single Gaussian based skin likelihood estimation.

Skin detection is a technique by which skin is detected in an image, series of images, or video. Skin detection may be applied to on a per-pixels basis or a per-region basis. In some cases, a pixel may be transformed into a particular color space, and a skin classifier model may be used to determine if the pixel or region is classified as skin or non-skin. Skin detection predicts the likelihood of each pixel in given image/video to be skin color. In traditional pixel-based skin detection, color space and parametric skin classifier models are research points which are trained in offline mode. In some scenarios, lighting conditions, different ethnicity, and the like will impact the particular skin color and the accuracy of skin detection with an offline model.

Skin detection techniques may seek to categorize each pixel in an image into a skin or non-skin class. In such contexts, the choice of color space for representing image pixels, the technique used for modeling and classifying skin, and the technique used for adapting to dynamic variations in video sequences may be three important factors in skin detection accuracy. For example, many color spaces such as the red, green, blue (RGB) color space and linear and non-linear transformations from RGB such as the hue, saturation, value (HSV) representation of the RGB color space, the luma, blue difference, red difference (YCbCr) encoding of the RGB color space, the CIE-Lab color space, or the like may be used in skin detection. Furthermore, a variety of offline classifiers may be used in skin detection. Such classifiers may be trained via laborious and costly offline training such as allocating and annotating billions of training pixels. Furthermore, such classifiers may only be applicable and/or adaptable to a limited range of application scenarios and their performance may degrade sharply when used in unconstrained environments. To attain improved results in such environments, some models propose to update parameters of the offline training classifiers over time. However, such techniques are prone to problems with the introduction of unexpected errors from using false positives and other problems.

Embodiments described herein perform single Gaussian based skin likelihood estimation. The single Gaussian model is used to improve smoothness of the resulting skin map. Additionally, the present techniques implement a GPU optimization technique, wherein skin likelihood tasks are partitioned between the CPU and the GPU.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an exemplary system that enables single Gaussian based skin likelihood estimation. The electronic device 100 may be, for example, a laptop computer, tablet computer, mobile phone, smart phone, or a wearable device, among others. The electronic device 100 may be used to receive streaming data, and may be referred to as a receiver. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, streaming data, or the like, to be rendered or displayed to a user of the electronic device 100. In some embodiments, the GPU 108 includes a number of graphics engines, wherein each graphics engine is configured to perform specific graphics tasks, or to execute specific types of workloads.

In embodiments, the GPU may perform exponential calculations associated with the skin likelihood estimation. Due to the parallel computation architectures of a GPU, the GPU can perform the exponential calculations relatively quickly. In embodiments, the skin likelihood estimation includes Streaming SIMD Extensions (SSE) instructions that are executed by the CPU and GL for Graphics Library (OPENGL) instructions that are executed by the GPU. Additionally, the face area estimation and Gaussian modeling may be performed by the CPU, while skin detection is performed by the GPU. In this manner, the enables single Gaussian based skin likelihood estimation as described herein may be GPU optimized.

The CPU 102 can be linked through the bus 106 to a display interface 110 configured to connect the electronic device 100 to one or more display devices 112A. The display devices 112 can include a display screen that is a built-in component of the electronic device 100. In embodiments, the display interface 110 is coupled with the display devices 112B via any networking technology such as cellular hardware 124, WiFi hardware 126, or Bluetooth Interface 128 across the network 130. The display devices 112B can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116A. The I/O devices 116A can include, for example, a keyboard and a pointing device, wherein the pointing device can include a touchpad or a touchscreen, among others. The I/O devices 116A can be built-in components of the electronic device 100, or can be devices that are externally connected to the electronic device 100. Accordingly, in embodiments, the I/O device interface 114 is coupled with the I/O devices 116B via any networking technology such as cellular hardware 124, Wifi hardware 126, or Bluetooth Interface 128 across the network 130. The I/O devices 116B can also include any I/O device that is externally connected to the electronic device 100.

The electronic device 100 also includes a skin detection mechanism 118. In embodiments, the skin detection mechanism 118 is a hardware module or software module that enables single Gaussian based skin likelihood estimation. Accordingly, the skin detection mechanism 118 may be a controller that is to partition skin detection tasks between the CPU and the GPU. The skin detection mechanism 118 may be a drive that is to partition skin detection tasks between the CPU and the GPU. Additionally, in embodiments, the skin detection mechanism 118 may execute skin detection tasks without the CPU and the GPU.

After skin detection has been performed, the skin detection result is utilized in skin related beautification modules, including skin whitening and skin smoothing. The skin detection result may be referred to as a skin map. For example, the image capture mechanism 120 may capture an image, a series of image, or a video. The skin detection mechanism may perform single Gaussian based skin likelihood estimation on images from the image capture mechanism 120. The present techniques can detect skin by first generating a single Gaussian model for skin and non-skin based on a face bounding box. The likelihood of skin for each pixel of the face bounding box is calculated based on the Gaussian models. Because of the expensive computation cost of exponential operations in associated with finding the likelihood of skin for each pixel of the face bounding box, especially on mobile platforms, the parallel computation power of GPU is used to perform the exponential calculation. The single Gaussian model for skin and non-skin based on a face bounding box is calculated using the CPU side, resulting in a set of model parameters. Updates to the model parameters, can be performed at a rate of every 10/20 frames, which will decrease the CPU cost.

The storage device 122 is a physical memory such as a hard drive, an optical drive, a flash drive, an array of drives, or any combinations thereof. The storage device 122 can store user data, such as audio files, video files, audio/video files, and picture files, among others. The storage device 122 can also store programming code such as device drivers, software applications, operating systems, and the like. The programming code stored to the storage device 122 may be executed by the CPU 102, GPU 108, or any other processors that may be included in the electronic device 100.

The CPU 102 may be linked through the bus 106 to cellular hardware 124. The cellular hardware 124 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 100 may access any network 130 without being tethered or paired to another device, where the cellular hardware 124 enables access to the network 130.

The CPU 102 may also be linked through the bus 106 to WiFi hardware 126. The WiFi hardware 126 is hardware according to WiFi standards (standards promulgated as Institute of Electrical and Electronics Engineers' (IEEE) 802.11 standards). The WiFi hardware 126 enables the electronic device 100 to connect to the Internet using the Transmission Control Protocol and the Internet Protocol (TCP/IP). Accordingly, the electronic device 100 can enable end-to-end connectivity with the Internet by addressing, routing, transmitting, and receiving data according to the TCP/IP protocol without the use of another device. Additionally, a Bluetooth Interface 128 may be coupled to the CPU 102 through the bus 106. The Bluetooth Interface 128 is an interface according to Bluetooth networks (based on the Bluetooth standard promulgated by the Bluetooth Special Interest Group). The Bluetooth Interface 128 enables the electronic device 100 to be paired with other Bluetooth enabled devices through a personal area network (PAN). Accordingly, the network 130 may be a PAN. Examples of Bluetooth enabled devices include a laptop computer, desktop computer, ultrabook, tablet computer, mobile device, or server, among others.

The network 130 may be used to obtain data for perform skin detection as discussed herein. In embodiments, online refers to the real time skin and non-skin modeling, where data and parameters may be obtained using the network 130. In embodiments, online skin likelihood estimation may also refer to skin likelihood estimation without the use of offline training.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
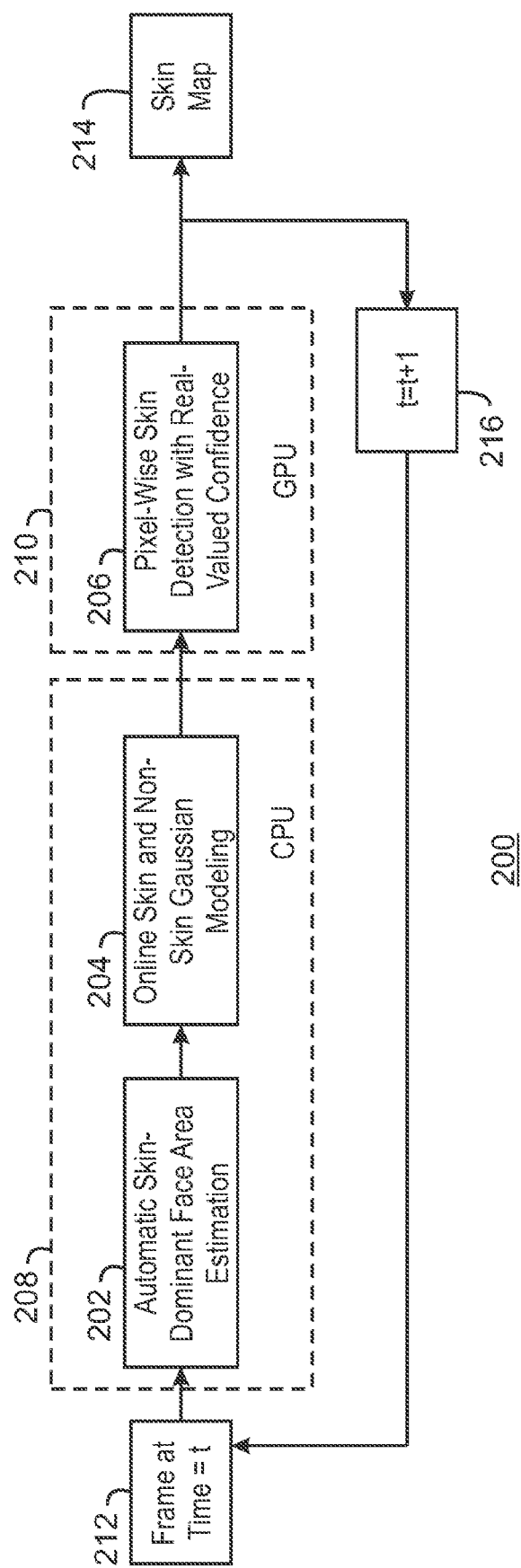
FIG. 2 is a process flow diagram of a method 200 for single Gaussian based skin likelihood estimation.

FIG. 2 is a process flow diagram of a method 200 for single Gaussian based skin likelihood estimation. The method 200 includes three main modules automatic skin-dominant face area estimation at block 202, online skin and non-skin modeling at block 204, and pixel-wise skin detection with real-valued confidence at block 206. The calculation tasks associated with the single Gaussian based skin likelihood estimation are further divided into two parts: block 208, where the face area estimation and Gaussian modeling tasks are allocated on CPU, and block 210 with skin detection tasks allocated on GPU.

At block 212, a frame at time t is obtained. The frame at time t may be input to block 202, where automatic skin dominant face area estimation is performed. The automatic skin dominant face area estimation provides a coarse face area within the frame that represents a skin dominant region. In embodiments, the automatic skin dominant face area estimation may receive or generate landmarks or landmark data indicative of a detected body part such as a face, hand, arm, or the like. For example, facial landmarks may include landmarks associated with the face, such as eye features, eyebrow features, nose features, mouth features. Body landmarks may include fingers, hands, and the like.

Any number of facial landmarks may be detected, tracked across image frames of a video sequence, and/or validated. In some examples, about 20 to 40 landmarks may be detected, tracked, and/or validated. Such facial landmarks may be provided to or generated at block 202. The automatic skin dominant face area estimation at block 202 may generate skin dominant region data based on the landmarks. A minimum bounding box including the landmarks may be determined. The minimum bounding box may be iteratively expanded to generate or provide a skin dominant region. The minimum bounding box may be, for example, a rectangle of a minimum size that includes all of the landmarks. Furthermore, the minimum bounding box may be expanded to generate the skin dominant region. For example, the borders of the minimum bounding box may be expanded by a predefined amount (e.g., an expansion parameter or parameters defining expansion in directions around the minimum bounding box), by taking a factor of a padding parameter and the size of the original image, or the like. The padding ratios may include any suitable values such as values in the range of about 1/20 to 1/10 or in the range of about 1/10 to 1/5 or the like. In some examples, some or all of the padding ratios may be the same and, in other examples, the may all be different.

The frame along with a bounding box defining at least one skin dominant region may be provided to block 204. Although the bounding as described herein has been referred to as a box, the bounded area with at least one skin dominant region may be of any shape or size. Furthermore, the skin dominant region may be characterized as a skin region, a foreground region, a facial region (in some contexts), a hand region (in some contexts), a region of interest, or the like. The automatic skin dominant face area estimation may also define a background region and/or a foreground region. Most skin pixels of person may be within skin dominant region and the background region. The background region may be a number of regions outside of the skin dominant regions that mostly includes non-skin pixels. While some non-skin pixels (e.g., pixels associated with eyebrows, eyeballs, mouths, lips, glasses, etc.) may also be included in skin dominant region, the portion of such pixels within skin dominant region is less than the portion of skin pixels. Similarly, the background region may also include some skin pixels, but, again, the portion of such skin pixels is less than the portion of non-skin pixels. At block 204, online skin and non-skin Gaussian modeling is performed. Online (e.g., real time) skin and non-skin modeling may be performed based on color values of pixels within the skin dominant region and color values of pixels outside of the skin dominant region.

At block 204, a skin and a non-skin model may be constructed based on the color distributions of image pixels within skin dominant region and those outside of skin dominant region. As discussed above, skin dominant region data may be provided to block 204. A skin model and a non-skin model may be generated at block 204 based on pixel values associated with pixels within the skin dominant region associated with the skin dominant region data and pixel values associated with another region of image data.

For example, skin and non-skin modeling module 102 may also receive image data. Online skin and non-skin Gaussian modeling may be performed to generate the skin model and the non-skin model using any suitable technique or techniques. For example, a skin model based may be generated based on the on the color values of pixels within skin dominant region and a non-skin model based on the color values of pixels within another region of the image. The other region of image may be any suitable region outside of skin dominant region. In some examples, the entirety of the background region (e.g., the entirety of the image outside of skin dominant region) may be used to generate the non-skin model. In other examples, a random or preselected portion or sampling if image region outside of skin dominant region may be used. Furthermore, the skin and non-skin Gaussian modeling module may provide the skin model and the non-skin model as online modeling data (OM).

Online skin and non-skin Gaussian modeling may generate the skin model and the non-skin model using a single Gaussian model to generate a robust and smooth skin map. For skin and non-skin color, a single Gaussian model is constructed to fit the color distribution of the image in frame $I_r$. In frame $I_r$, let $f=\{u(x_k, y_k)\}_{k=1,\ldots,M}$ be the color feature set of image pixels belongs to the above described skin-dominant foreground area or non-skin dominated background area, where $u(x_k, y_k)$ is the color feature vector of an image pixel located at $(x_k, y_k)$, and M is the number of pixels. The image in frame $I_r$ may be the color feature set of image pixels belonging to a skin dominant region or another, non-skin dominant region. For example, the color feature set of a skin dominant region may be characterized as $f_{skin}$ the color feature set of a non-skin dominant region may be characterized as $f_{non-skin}$. Furthermore, $u(x_k, y_k)$ may be the color feature vector of an image pixel located at $(x_k, y_k)$, and M is the number of pixels. The color feature vector may be a one-dimensional (1D), two-dimensional (2D), or three-dimensional (3D) or more color vector in any color space. For example, the color feature vector may include one or more color values (e.g., including luma values) available at the pixel location based on the color space of image data. As discussed, image data may be in any color space having any number of color channels. The color feature vector may include all, some, or one of such color channels. For example, if the image data is in an RGB color space, the color feature vector may be a 3D vector having an R value, a G value, and a B value or the color feature vector may be a 2D vector having an R value and a G value (or a G value and a B value or an R value and a B value). An advantage of the techniques discussed herein may be that no color conversion of image data may be required, for example, and online modeling data may be generated in the native color space of image data (e.g., based on image capture via an image sensor and/or image capture processing via an image signal processor or the like).

Block 204 may generate an online skin and non-skin Gaussian model. For each color vector, the mean and variance of skin and non-skin pixels are calculated as $\mu_i$ and $\sigma_i$, in which i=1, ..., N, where N is the dimension of color space. Then, the single Gaussian model based skin/non-skin model is constructed as $$G(i) = \frac{(u(x_k, y_k) - \mu_i)^2}{2\sigma_i^2}, i=1, \ldots, N \qquad (1)$$

From above single Gaussian online modeling, the distribution of skin and non-skin model represents the practical color distribution of image pixels in skin and non-skin area. Thus, the skin likelihood function can be built as:

$$P(i) = \exp(G_{skin}(i) - G_{non-skin}(i)), i=1, \ldots, N \qquad (2)$$

In embodiments, because the exponential skin likelihood function is a positive monotone increasing function, it guarantees the correctness of the probability result.

The models generated at block 204, $G_{skin}$ and $G_{non-skin}$ using Eqn. 1 may represent the practical color distributions of image pixels in a skin dominant region (e.g., a facial region, a hand region, or the like) and a non-skin dominant region (e.g., a background region or the like). Such models may be used to determine a representative discriminative skin likelihood function P(i) as illustrated in FIG. 2. The likelihood function P(i) may be provided to block 206 where pixel-wise skin detection is performed with real confidence.

At block 206, a skin map is generated by performing pixel-wise skin detection is performed with real confidence. The pixel-based skin detection module 206 may receive a likelihood function from the online skin and non-skin Gaussian modeling module 204. The pixel-based skin detection module 206 may classify individual pixels of image data (e.g., all pixels or sample pixels of image data) as skin pixels or non-skin pixels and skin label data may include such classifications (e.g. as a binary image or mask including a value of 1 for skin pixels and a value of 0 for non-skin pixels or the like). For example, pixel-based skin detection module 206 may also receive image data for performing such classifications. Furthermore, skin label data may include, for each classified pixel of image data, a confidence value associated with the classification. For example, a pixel classified as a skin pixel with high confidence may include a binary value of 1 indicative of the skin pixel classification and a relatively high confidence value and a pixel classified as a skin pixel with low confidence may include a binary value of 1 indicative of the skin pixel classification but a relatively low confidence value. Such binary values and confidence values may be used by other modules to perform digital make up, video based beautification, face tracking, face enhancement, 3-dimensional face modeling, hand gesture detection and tracking, people retrieval from databases, or the like. Skin label data may be generated as a skin map 214. In embodiments, skin label data may be characterized, for example, as skin detection data, skin map estimation data, skin modeling data, or the like. At block 216, time is incremented and the next frame can be processed.

The likelihood function P(i) generated by the online skin and non-skin Gaussian modeling module 204 may measure the separation of clustered color values between a skin dominant region and another (non-skin dominant) region. Furthermore, as discussed, pixel-based skin detection module 206 may classify individual pixels of image data. Based on the likelihood function P(i), each pixel $u(x_k, y_k)$ in the image frame $I_t$ may be classified into skin and non-skin classes using the following equation:

$$C(u(x_k, y_k)) = \begin{cases} 1 & \text{if } P(G(u(x_k, y_k))) > \tau \\ 0, & \text{otherwise} \end{cases} \quad (3)$$

Where C is the classification (e.g., 1 for pixels classified as skin pixels and 0 for pixels classified as non-skin pixels), P is the likelihood function, $\tau$ is a threshold, and $P(G(u(x_k, y_k)))$ is the real confidence of image pixel located at $x_k, y_k$. The threshold value $\tau$ may be characterized as a likelihood threshold, a skin pixel threshold, or the like. The threshold value may be any suitable value such as a value in the range of about −0.2 to about −0.3, a value in the range of about −0.2 to −0.25, or the like.

As shown with respect to Equation (3), pixel-based skin detection module 206 may determine, for an individual pixel $x_k, y_k$, a Gaussian distribution (e.g., based on the single Gaussian model G,) and a likelihood the pixel is a skin pixel (e.g., based on P). If the likelihood is greater than a threshold, $\tau$, the pixel may be classified as a skin pixel (e.g., given a value of 1) and, if not, the pixel may be classified as a non-skin pixel (e.g., given a value of 0). The likelihood or skin classification value or the like for a particular pixel (e.g., $P(G(u(x_k, y_k)))$) may be provided as a real-valued confidence or confidence value and, in some examples, the likelihood may be quantized or vectorized to a value in the range of 0 to 255, 0 to 128, or the like for inclusion in skin label data 120. The present techniques have been described using red, green and blue channels of basic RGB color space and respective discriminative skin likelihood function in each frame for ease of description. However, any color space may be used according to the present techniques.

Figure 3:
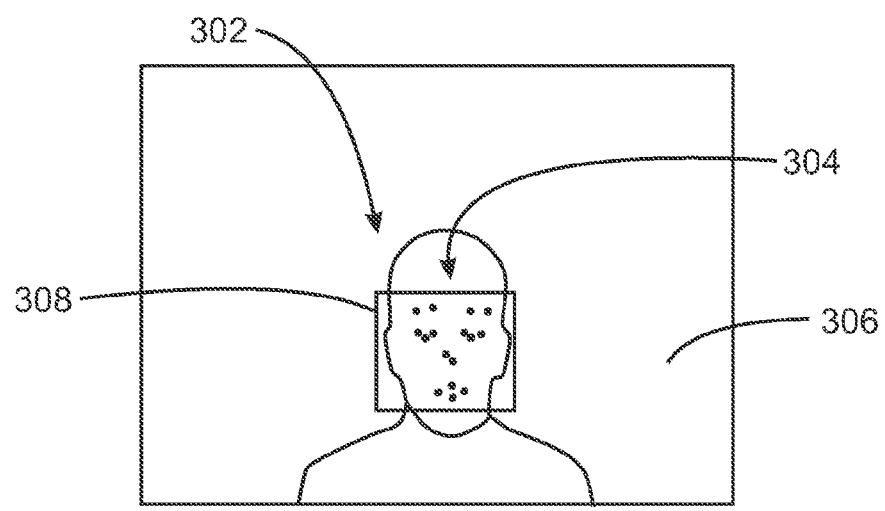
FIG. 3 is a frame including an image 300 with facial landmarks.

FIG. 3 is a frame including an image 300 with facial landmarks. The frame 300 includes a person 302 with facial landmarks 304. As shown in FIG. 3, image 300 may also include a background 306. The facial landmarks 304 may include landmarks associated with eye features, eyebrow features, nose features, mouth features, or the like. As discussed above, any number of facial landmarks 304 may be detected, tracked across image frames of a video sequence, and/or validated. In some examples, about 20 to 40 landmarks may be detected, tracked, and/or validated. Such facial landmarks 204 may be provided to or generated by automatic skin dominant face area estimation module 202. A bounding box 308 that includes all landmarks 304 is also illustrated. In examples, the bounding box may be iteratively expanded to include all skin areas, such as the top portion of the face of person 302.

The skin map generated by single Gaussian based skin likelihood estimation is smooth enough for skin beautification applications without generating spots on the skin after skin smoothing and whitening. This is a direct result of the smoothness of the single Gaussian model is introduced to improve the smoothness of skin map and the GPU optimization. Skin likelihood estimation without a single Gaussian based model typically shows great discontinuities in the skin surface. The single Gaussian based skin likelihood estimation as described herein results in a smooth skin map.

Tables 1 and 2 below illustrate the performance data comparison between a non-optimized single Gaussian based skin likelihood estimation and an optimized single Gaussian based skin likelihood estimation. As used herein, a non-optimized single Gaussian based skin likelihood estimation is performed on using a single processor. An optimized single Gaussian based skin likelihood estimation is performed with tasks partitioned between a CPU and GPU, based on processing advantages presented by each of the CPU and the GPU.

In examples, the code processed by the CPU has been highly optimized in SSE instructions while code on GPU side has been implemented in OPENGL. Table 1 corresponds to a mobile platform that supports SSE, SSE2 instructions and integrates a first graphics accelerator/GPU. Table 2 corresponds to a mobile platform that supports SSE, SSE2 also but integrates a second, different graphics accelerator/GPU.

TABLE 1

First graphics accelerator/GPU

| Size of Skin-map (width × height) | Non-optimized Single Gaussian Algorithm | | Optimized Single Gaussian Algorithm | | | |
|---|---|---|---|---|---|---|
| | CPU-time/ms | FPS | CPU-time/ms | GPU-time/ms | FPS of Serial Mode | FPS of Parallel Mode |
| 320 × 180 | 36.48 | 27 | 1.25 | 1.17 | 413 | 800 |
| 320 × 240 | 52.74 | 19 | 1.31 | 1.23 | 393 | 763 |

TABLE 2

Second graphics accelerator/GPU

| Size of Skin-map (width × height) | Non-optimized Single Gaussian Algorithm | | Optimized Single Gaussian Algorithm | | | |
|---|---|---|---|---|---|---|
| | CPU-time/ms | FPS | CPU-time/ms | GPU-time/ms | FPS of Serial Mode | FPS of Parallel Mode |
| 320 × 180 | 24.06 | 42 | 2.56 | 4.41 | 111 | 227 |
| 320 × 240 | 32.9 | 31 | 3.73 | 4.91 | 116 | 204 |

As shown in Table 1 and 2, the non-optimized performance for the single Gaussian model based skin detection algorithm is very time-consuming. This may be a direct result of implementing the exponential function on a CPU. Partitioning the online skin/non-skin modeling tasks and pixel-wise skin detection tasks into CPU and GPU tasks, respectively, is done as typical GPUs are parallel computing units that can execute exponential calculation in parallel for an input image, regardless of the speed or accelerations applied to the GPU. To reduce calculations, the resolution of the skin map is downsized into 320×240 or 320×180 for descriptive purposes. The present techniques calculate the mean and variance of pixels in skin and non-skin areas using the CPU. The skin likelihood function based on the CPU's results is computed using the GPU. In embodiments, for the CPU code, SSE/SSE2 intrinsics may be used to optimize data calculations at the CPU. The final performance values are shown in Table 1 and 2.

Figure 4:
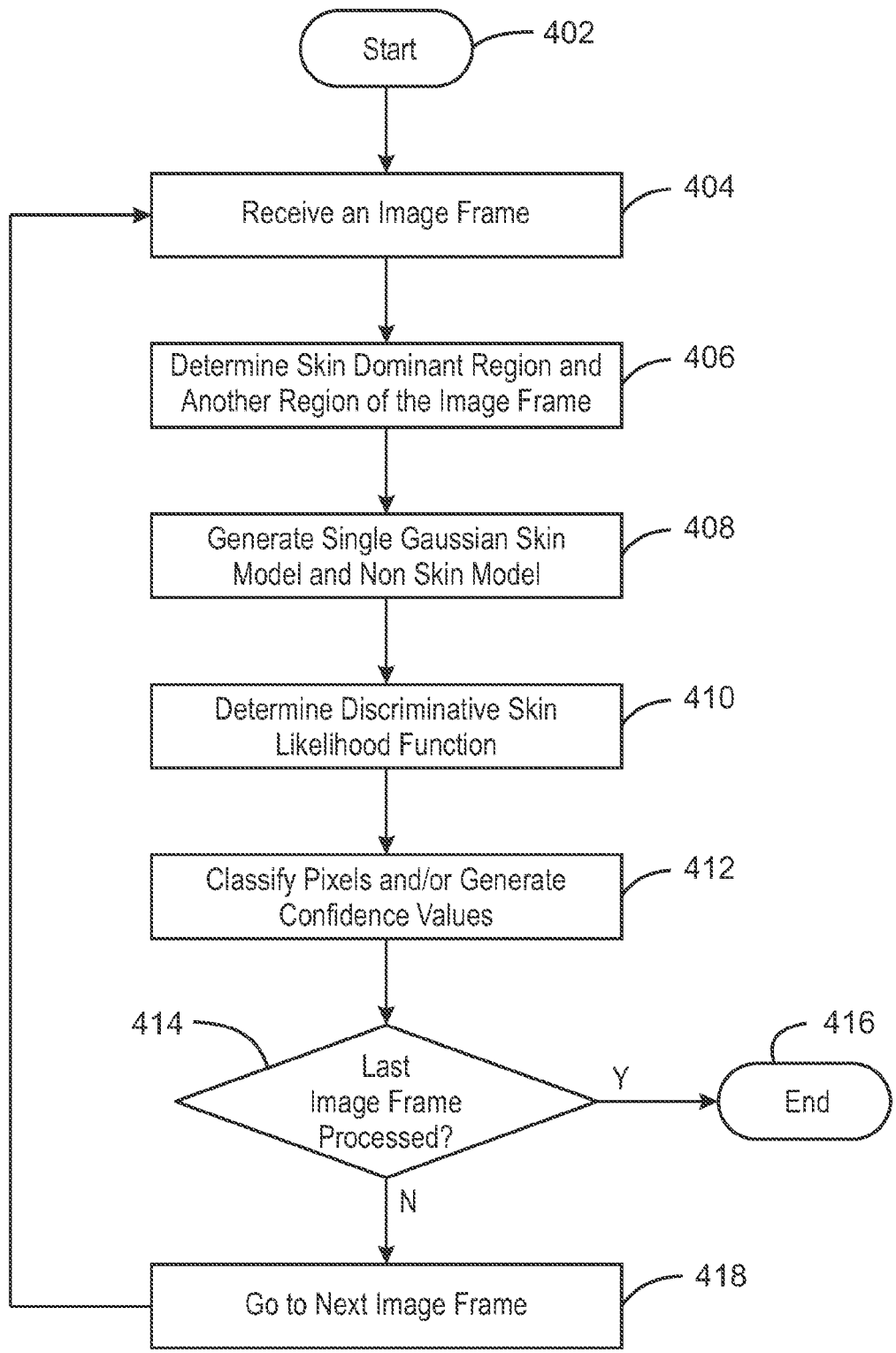
FIG. 4 is a process flow diagram of a method 400 for performing skin detection with a single Gaussian based skin likelihood estimation.

FIG. 4 is a process flow diagram of a method 400 for performing skin detection with a single Gaussian based skin likelihood estimation. The method 400 may be performed by a device (e.g., device 100, any other devices or systems discussed herein) or portions of method 400 may be performed by a device to provide skin detection and/or classification. Additionally, the method 400 or portions thereof may be repeated for any number of image frames, video sequences, or the like. The method 400 may begin from start at block 402.

At block 404, an image frame is received. In embodiments, the image frame may be an image frame of a video sequence. For example, the image 300 as described above may be an image frame. In embodiments, the image frame may be obtained from still images or the like. The image frame received at block 402 may include image data in any suitable format and any color space such as those discussed herein. At block 406, a skin dominant region and another region of the image frame is determined. In examples, the skin dominant region may be determined using any techniques discussed herein such as landmark determination, minimum bounding box generation, and expansion of the minimum bounding box to generate the skin dominant region. Furthermore, the skin dominant region may be determined based on the detection of any object such as a face or a hand or the like. In embodiments, a single skin dominant region or multiple skin dominant regions may be determined. The other region of the image frame may include the background region of the image frame or any other non-skin dominant region of the image frame.

At block 408, a single Gaussian skin model and non-skin model are generated. The skin model may be generated based on the skin dominant region and a non-skin model may be generated based on the other region. Such models may include any suitable models such as color based models as discussed herein. For example, such models may be based on color feature vectors of pixels within the skin dominant region and the other region. As described herein, the skin model and the non-skin model may each be single Gaussian based models. In embodiments, where multiple skin dominant regions are determined at block 406, such skin dominant regions may be combined to generate a single skin model or multiple skin models may be generated for such the skin dominant regions.

At block 410, a discriminative skin likelihood f unction may be determined. In embodiments, one or more discriminative skin likelihood functions may be determined based on the single Gaussian models generated at block 408. The discriminative skin likelihood function or functions determined at operation 410 may include any discriminative skin likelihood functions discussed herein such as a log-based discriminative skin likelihood function, a log-based classifier, a thresholding function, a Bayesian classifier, a Gaussian classifier, a multi-layer perceptron classifier, a neural network classifier, or the like.

At block 412, pixels of the image frame are classified as skin or non-skin pixels. In embodiments, confidence values associated with the classifications may be generated. For example, individual pixels of the image frame may be classified based on the discriminative skin likelihood function determined at block 410. For example, each pixel of the image frame may be classified (e.g., provided a 1 if classified as a skin pixel and a 0 if not) and provided a confidence value (e.g., such as a value ranging from 0 to 1, 0 to 255, 0 to 128, or the like associated with the confidence of the classification) may be generated at operation 412.

At block 414, it is determined if the last image frame has been processed. In embodiments, if no skin dominant region was detected at block 406, process flow may continue to block 416. If the last image frame has been processed, process flow continues to block 416. If the last image frame has not been processed, process flow continues to block 418.

At block 416, process flow ends. At block 418, the next image frame is selected. The next image frame may be processed according to blocks 404-418 as described herein. In this manner, each frame it iteratively processed until no frames remain to be processed. In embodiments, the method 400 may be performed in parallel or in series for any number of image frames, video sequences, or the like. Furthermore, the method 400 may provide a process flow for performing skin detection on all image frames of a video sequence. In other examples, only some image frames (e.g., a selected subset such as every other, every third, or the like) of a video sequence may be processed via operations 404-412. In yet other examples, method 400 may be evoked by a user or a driver or the like that indicates a video sequence is to be processed for skin detection. Such an evocation may include an image frame sampling pattern (e.g., all, every other, etc.) or the like.

The techniques discussed herein provide high quality skin detection with relatively low computational cost and a relatively low memory footprint. The results of the techniques discussed herein provide accurate skin pixel classification even in difficult image frames including background clutter, low illumination, varied user ethnicity, and so on. The smooth skin map can be used with skin beautification algorithms without adversely affecting the skin beautification algorithms.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 5:
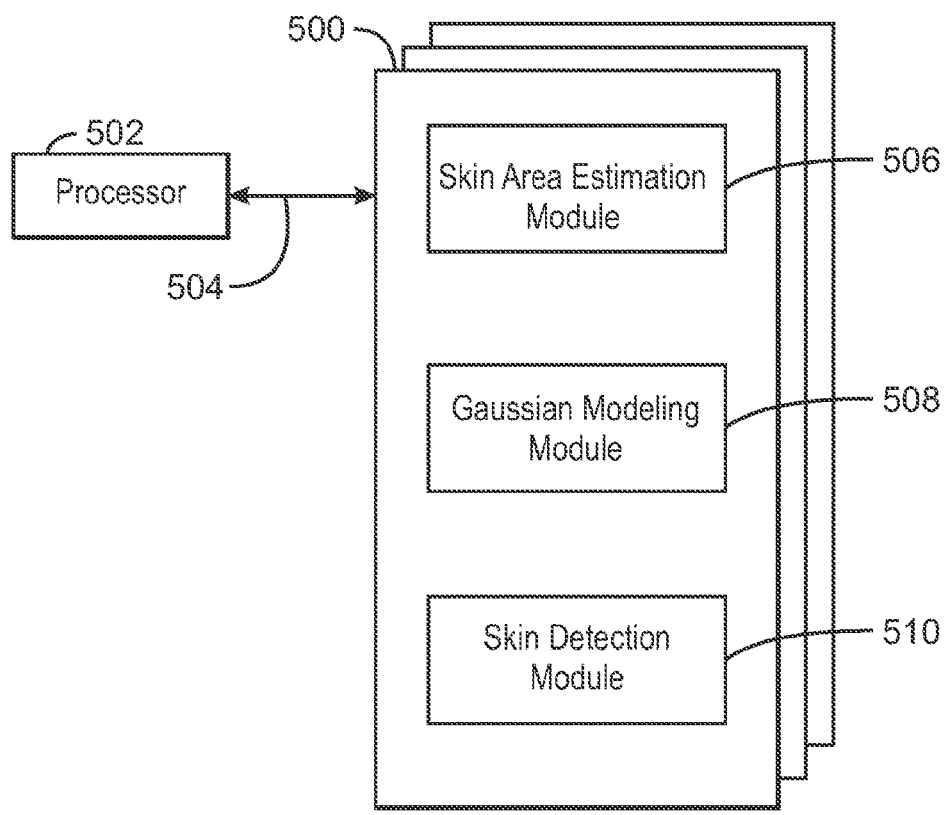
FIG. 5 is a block diagram showing a tangible, non-transitory computer-readable medium that stores instructions for performing skin detection with a single Gaussian based skin likelihood estimation.

FIG. 5 is a block diagram showing a tangible, non-transitory computer-readable medium that stores instructions for performing skin detection with a single Gaussian based skin likelihood estimation. The tangible, non-transitory computer-readable media 500 may be accessed by a processor 502 over a computer bus 504. Furthermore, the tangible, non-transitory computer-readable medium 500 may include code configured to direct the processor 502 to perform the methods described herein.

The various software components discussed herein may be stored on one or more tangible, non-transitory computer-readable media 500, as indicated in FIG. 5. A skin area estimation module 506 may be configured to perform automatic skin dominant face area estimation by providing a coarse face area within the frame that represents a skin dominant region. A single Gaussian modeling module 508 may be configured to construct a single Gaussian skin and a non-skin model based on the color distributions of image pixels within skin dominant region and those outside of skin dominant region.

A skin detection module 510 may be configured generate a skin map by performing pixel-wise skin detection is with real-valued confidence.

The block diagram of FIG. 5 is not intended to indicate that the tangible, non-transitory computer-readable media 500 is to include all of the components shown in FIG. 5. Further, the tangible, non-transitory computer-readable media 500 may include any number of additional components not shown in FIG. 5, depending on the details of the specific implementation.

The present techniques do not require any offline trained skin and non-skin classifiers to perform pixel-wise skin detection. Skin detection may be formulated as an online discriminative modeling and classification problem using a coarse area of user face as only known prior to skin detection. Additionally, online discriminative learning may be used to model the respective color distributions of skin and non-skin pixels in an image frame. The online built discriminative skin likelihood function may be used to categorize each image pixel into skin or non-skin class with real-valued confidence. According to the present techniques, both the CPU and GPU are used to generate the final skin-likelihood results. Moreover, the skin may generated according to the present techniques does not require an average/box, etc. filter to smooth.

Figure 6:
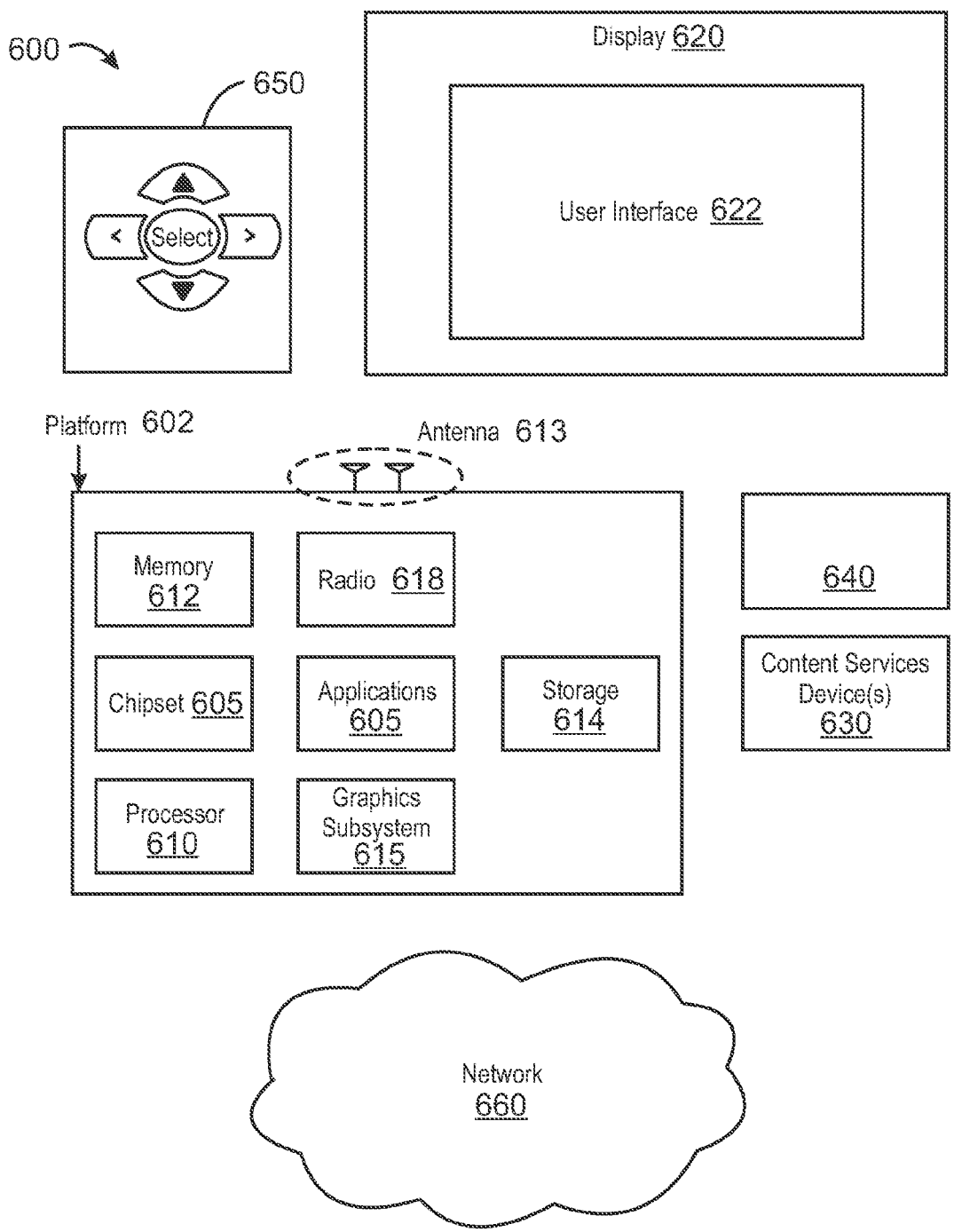
FIG. 6 is an illustrative diagram of an example system 600, arranged in accordance with at least some implementations of the present disclosure.

FIG. 6 is an illustrative diagram of an example system 600, arranged in accordance with at least some implementations of the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 600 includes a platform 602 coupled to a display 620. Platform 602 may receive content from a content device such as content services device(s) 630 or content delivery device(s) 640 or other similar content sources. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, antenna 613, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM). Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 may be integrated into processor 610 or chipset 605. In some implementations, graphics subsystem 615 may be a stand-alone device communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of uni-directionally or bi-directionally communicating content between content providers and platform 602 and/display 620, via network 660 or directly. It will be appreciated that the content may be communicated uni-directionally and/or bi-directionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way. In various implementations, platform 602 may receive control signals from navigation controller 650 having one or more navigation features. The navigation features of controller 650 may be used to interact with user interface 622, for example. In various embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the 6 computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In various embodiments, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
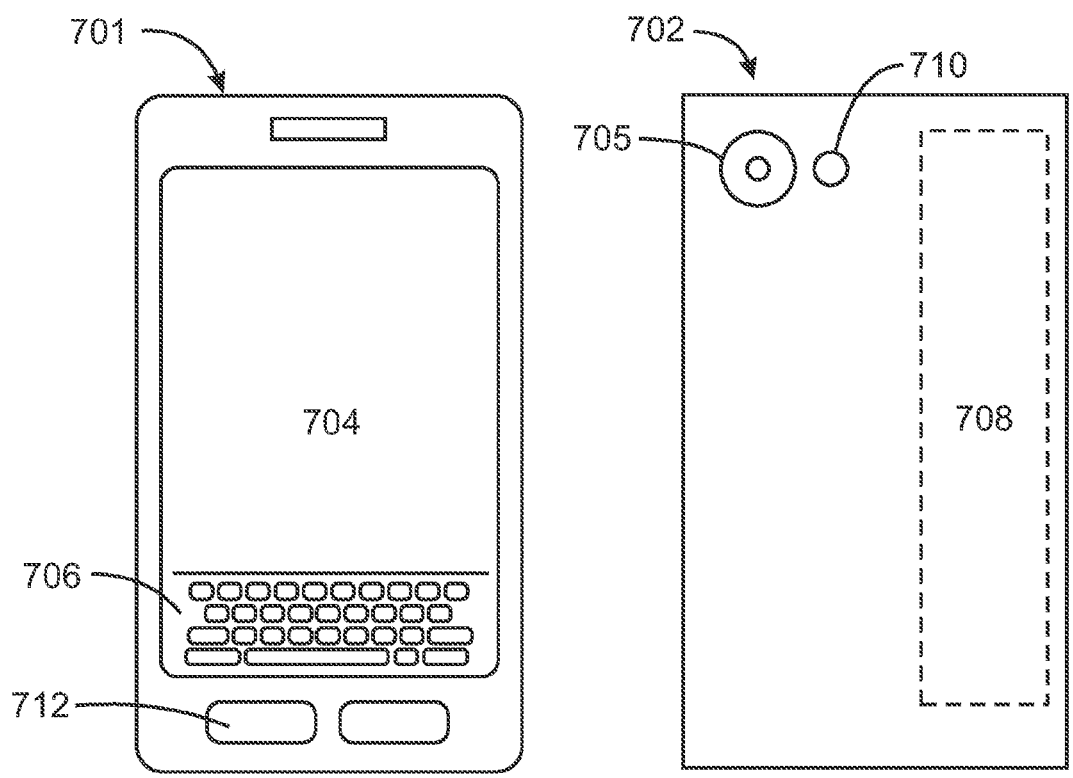
FIG. 7 illustrates an example small form factor device 700 in which the system of FIG. 6 may be embodied.

As described above, system 600 may be embodied in varying physical styles or form factors. FIG. 7 illustrates an example small form factor device 700, arranged in accordance with at least some implementations of the present disclosure. In some examples, system 600 may be implemented via device 700. In other examples, device 60, system 900, or portions thereof may be implemented via device 700. In various embodiments, for example, device 700 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing with a front 701 and a back 702. Device 700 includes a display 704, an input/output (I/O) device 706, and an integrated antenna 708. Device 700 also may include navigation features 712. I/O device 706 may include any suitable I/O device for entering information into a mobile computing device. Examples for I/O device 706 may include an alphanumeric keyboard, a numeric keypad, a touch pad, input keys, buttons, switches, microphones, speakers, voice recognition device and software, and so forth. Information also may be entered into device 700 by way of microphone (not shown), or may be digitized by a voice recognition device. As shown, device 700 may include a camera 705 (e.g., including a lens, an aperture, and an imaging sensor) and a flash 710 integrated into back 702 (or elsewhere) of device 700. In other examples, camera 705 and flash 710 may be integrated into front 701 of device 700 or both front and back cameras may be provided. Camera 705 and flash 710 may be components of a camera module to originate image data processed into streaming video that is output to display 704 and/or communicated remotely from device 700 via antenna 708 for example.

Example 1 is a system for performing single Gaussian skin detection. The system includes a memory configured to receive image data; and a processor coupled to the memory, the processor to generate a single Gaussian skin model based on a skin dominant region associated with the image data and a single Gaussian non-skin model based on a second region associated with the image data and to classify individual pixels associated with the image data via a discriminative skin likelihood function based on the single Gaussian skin model and the single Gaussian non-skin model to generate skin label data associated with the image data.

Example 2 includes the system of example 1, including or excluding optional features. In this example, classifying individual pixels comprises comparing a skin classification value for a first individual pixel to a predetermined threshold value.

Example 3 includes the system of any one of examples 1 to 2, including or excluding optional features. In this example, the discriminative skin likelihood function comprises at least one of a log-based classifier, a thresholding function, a Bayesian classifier, a Gaussian classifier, a multilayer perceptron classifier, or a neural network classifier.

Example 4 includes the system of any one of examples 1 to 3, including or excluding optional features. In this example, the image data comprises an image frame of a video sequence, and wherein the processor to generate the skin model and the non-skin model and to classify the individual pixels comprises the processor to generate the skin model and the non-skin model and to classify the individual pixels online with respect to the video sequence.

Example 5 includes the system of any one of examples 1 to 4, including or excluding optional features. In this example, the image data comprises an image frame of a video sequence and the processor is further to receive second image data associated with a second image frame of the video sequence, to generate a second skin model and a second non-skin model based on the second image frame, and to classify second individual pixels associated with the second image data via a second discriminative skin likelihood function based on the second skin model and the second non-skin model to generate second skin label data associated with the second image data. Optionally, the processor is to receive the second image data after the individual pixels of the image data are classified.

Example 6 includes the system of any one of examples 1 to 5, including or excluding optional features. In this example, the skin label data further comprises, for each of the individual pixels, a classification confidence value.

Example 7 includes the system of any one of examples 1 to 6, including or excluding optional features. In this example, the processor is further to determine a minimum bounding box based on a plurality of facial feature landmarks and to expand the minimum bounding box to generate the skin dominant region.

Example 8 includes the system of any one of examples 1 to 7, including or excluding optional features. In this example, the image data is in a color space comprising at least one of a red green blue color space, a luminance chroma color space, a luminance blue difference red difference color space, or a hue saturation value color space. Optionally, the color space comprises the red, green, blue color space and wherein the skin model is based on red and green channels of the red, green, blue color space.

Example 9 includes the system of any one of examples 1 to 8, including or excluding optional features. In this example, the processor is further to generate a second skin model based on a second skin dominant region associated with the image data and wherein the processor to classify the individual pixels associated with the image data further comprises the processor to classify the individual pixels as first skin pixels associated with the skin dominant region or second skin pixels associated with the second skin dominant region.

Example 10 is a method for performing skin detection. The method includes generating a single Gaussian skin model based on a skin dominant region of an image and a single Gaussian non-skin model based on a second region of the image; determining a discriminative skin likelihood function based on the a single Gaussian skin model and the single Gaussian non-skin model; and classifying individual pixels of the image as skin pixels or non-skin pixels based on the discriminative skin likelihood function to generate skin label data associated with the image.

Example 11 includes the method of example 10, including or excluding optional features. In this example, classifying individual pixels comprises comparing a skin classification value for a first individual pixel to a predetermined threshold value.

Example 12 includes the method of any one of examples 10 to 11, including or excluding optional features. In this example, the discriminative skin likelihood function comprises at least one of a log-based classifier, a thresholding function, a Bayesian classifier, a Gaussian classifier, a multilayer perceptron classifier, or a neural network classifier.

Example 13 includes the method of any one of examples 10 to 12, including or excluding optional features. In this example, the image comprises an image frame of a video sequence, and wherein generating the skin model and the non-skin model, determining the discriminative skin likelihood function, and classifying the individual pixels are performed online during processing of the video sequence.

Example 14 includes the method of any one of examples 10 to 13, including or excluding optional features. In this example, the image comprises an image frame of a video sequence, the method further comprising: receiving a second image frame of the video sequence; generating a second skin model and a second non-skin model based on the second image frame; determining a second discriminative skin likelihood function based on the second skin model and the second non-skin model; and classifying second individual pixels of the second image frame based on the second discriminative skin likelihood function to generate second skin label data associated with the second image frame Optionally, the second image frame is received after the individual pixels of the image are classified.

Example 15 includes the method of any one of examples 10 to 14, including or excluding optional features. In this example, the skin label data further comprises, for each of the individual pixels, a classification confidence value.

Example 16 includes the method of any one of examples 10 to 15, including or excluding optional features. In this example, the method includes determining a minimum bounding box based on a plurality of facial feature landmarks and expanding the minimum bounding box to generate the skin dominant region.

Example 17 includes the method of any one of examples 10 to 16, including or excluding optional features. In this example, the image is associated with image data in a color space comprising at least one of a red green blue color space, a luminance chroma color space, a luminance blue difference red difference color space, or a hue saturation value color space.

Example 18 includes the method of any one of examples 10 to 17, including or excluding optional features. In this example, the color space comprises a red, green, blue color space and wherein the skin model is based on red and green channels of the red, green, blue color space.

Example 19 includes the method of any one of examples 10 to 18, including or excluding optional features. In this example, the method includes generating a second skin model based on a second skin dominant region of the image; and determining a second discriminative skin likelihood function based on the second skin model and the second non-skin model, wherein classifying the individual pixels of the image further comprises classifying the individual pixels as first skin pixels associated with the skin dominant region or second skin pixels associated with the second skin dominant region.

Example 20 is a apparatus for performing skin detection. The apparatus includes a means for generating a single Gaussian skin model based on a skin dominant region of an image and a single Gaussian non-skin model based on a second region of the image; a means for determining a discriminative skin likelihood function based on the single Gaussian skin model and the single Gaussian non-skin model; and a means for classifying individual pixels of the image as skin pixels or non-skin pixels based on the discriminative skin likelihood function to generate skin label data associated with the image.

Example 21 includes the apparatus of example 20, including or excluding optional features. In this example, the means for classifying individual pixels comprises means for comparing a skin classification value for a first individual pixel to a predetermined threshold value.

Example 22 includes the apparatus of any one of examples 20 to 21, including or excluding optional features. In this example, the discriminative skin likelihood function comprises at least one of a log-based classifier, a thresholding function, a Bayesian classifier, a Gaussian classifier, a multi-layer perceptron classifier, or a neural network classifier.

Example 23 includes the apparatus of any one of examples 20 to 22, including or excluding optional features. In this example, the image comprises an image frame of a video sequence, and wherein the means for generating the skin model and the non-skin model, the means for determining the discriminative skin likelihood function, and the means for classifying the individual pixels are to operate online with respect to the video sequence.

Example 24 includes the apparatus of any one of examples 20 to 23, including or excluding optional features. In this example, the image comprises an image frame of a video sequence, the apparatus further comprising: a means for receiving a second image frame of the video sequence; a means for generating a second skin model and a second non-skin model based on the second image frame; a means for determining a second discriminative skin likelihood function based on the second skin model and the second non-skin model; and a means for classifying second individual pixels of the second image frame based on the second discriminative skin likelihood function to generate second skin label data associated with the second image frame. Optionally, the means for receiving the second image frame are to receive the second image frame after the individual pixels of the image are classified.

Example 25 includes the apparatus of any one of examples 20 to 24, including or excluding optional features. In this example, the skin label data further comprises, for each of the individual pixels, a classification confidence value.

Example 26 includes the apparatus of any one of examples 20 to 25, including or excluding optional features. In this example, the apparatus includes a means for determining a minimum bounding box based on a plurality of facial feature landmarks and means for expanding the minimum bounding box to generate the skin dominant region.

Example 27 includes the apparatus of any one of examples 20 to 26, including or excluding optional features. In this example, the image is associated with image data in a color space comprising at least one of a red green blue color space, a luminance chroma color space, a luminance blue difference red difference color space, or a hue saturation value color space. Optionally, the color space comprises a red, green, blue color space and wherein the skin model is based on red and green channels of the red, green, blue color space.

Example 28 includes the apparatus of any one of examples 20 to 27, including or excluding optional features. In this example, the apparatus includes a means for generating a second skin model based on a second skin dominant region of the image; and a means for determining a second discriminative skin likelihood function based on the second skin model and the second non-skin model, wherein the means for classifying the individual pixels are further to classify the individual pixels as first skin pixels associated with the skin dominant region or second skin pixels associated with the second skin dominant region.

Example 29 is at least one machine readable medium comprising a plurality of instructions that. The computer-readable medium includes instructions that direct the processor to generating a single Gaussian skin model based on a skin dominant region of an image and a single Gaussian non-skin model based on a second region of the image; determining a discriminative skin likelihood function based on the single Gaussian skin model and the single Gaussian non-skin model; and classifying individual pixels of the image as skin pixels or non-skin pixels based on the discriminative skin likelihood function to generate skin label data associated with the image.

Example 30 includes the computer-readable medium of example 29, including or excluding optional features. In this example, classifying individual pixels comprises comparing a skin classification value for a first individual pixel to a predetermined threshold value.

Example 31 includes the computer-readable medium of any one of examples 29 to 30, including or excluding optional features. In this example, the discriminative skin likelihood function comprises at least one of a log-based classifier, a thresholding function, a Bayesian classifier, a Gaussian classifier, a multi-layer perceptron classifier, or a neural network classifier.

Example 32 includes the computer-readable medium of any one of examples 29 to 31, including or excluding optional features. In this example, the image comprises an image frame of a video sequence, and wherein generating the skin model and the non-skin model, determining the discriminative skin likelihood function, and classifying the individual pixels are performed online during processing of the video sequence.

Example 33 includes the computer-readable medium of any one of examples 29 to 32, including or excluding optional features. In this example, the computer-readable medium includes instructions that, in response to being executed on the computing device, cause the computing device to perform skin detection by: determining a minimum bounding box based on a plurality of facial feature landmarks and expanding the minimum bounding box to generate the skin dominant region.

Example 34 includes the computer-readable medium of any one of examples 29 to 33, including or excluding optional features. In this example, the computer-readable medium includes instructions that, in response to being executed on the computing device, cause the computing device to perform skin detection by: generating a second skin model based on a second skin dominant region of the image; and determining a second discriminative skin likelihood function based on the second skin model and the second non-skin model, wherein classifying the individual pixels of the image further comprises classifying the individual pixels as first skin pixels associated with the skin dominant region or second skin pixels associated with the second skin dominant region.

Example 35 includes the computer-readable medium of any one of examples 29 to 34, including or excluding optional features. In this example, the image comprises an image frame of a video sequence, the computer-readable medium further comprising: receiving a second image frame of the video sequence; generating a second skin model and a second non-skin model based on the second image frame; determining a second discriminative skin likelihood function based on the second skin model and the second non-skin model; and classifying second individual pixels of the second image frame based on the second discriminative skin likelihood function to generate second skin label data associated with the second image frame Example 36 includes the computer-readable medium of any one of examples 29 to 35, including or excluding optional features. In this example, the second image frame is received after the individual pixels of the image are classified.

Example 37 includes the computer-readable medium of any one of examples 29 to 36, including or excluding optional features. In this example, the skin label data further comprises, for each of the individual pixels, a classification confidence value.

Example 38 is an apparatus for performing skin detection. The apparatus includes instructions that direct the processor to a controller for generating a single Gaussian skin model based on a skin dominant region of an image and a single Gaussian non-skin model based on a second region of the image; a likelihood unit for determining a discriminative skin likelihood function based on the single Gaussian skin model and the single Gaussian non-skin model; and a classifier unit for classifying individual pixels of the image as skin pixels or non-skin pixels based on the discriminative skin likelihood function to generate skin label data associated with the image.

Example 39 includes the apparatus of example 38, including or excluding optional features. In this example, the classifier unit compares a skin classification value for a first individual pixel to a predetermined threshold value.

Example 40 includes the apparatus of any one of examples 38 to 39, including or excluding optional features. In this example, the discriminative skin likelihood function comprises at least one of a log-based classifier, a thresholding function, a Bayesian classifier, a Gaussian classifier, a multi-layer perceptron classifier, or a neural network classifier.

Example 41 includes the apparatus of any one of examples 38 to 40, including or excluding optional features. In this example, the image comprises an image frame of a video sequence, and wherein the means for generating the skin model and the non-skin model, the means for determining the discriminative skin likelihood function, and the means for classifying the individual pixels are to operate online with respect to the video sequence.

Example 42 includes the apparatus of any one of examples 38 to 41, including or excluding optional features. In this example, the image comprises an image frame of a video sequence, the apparatus further comprising: a receiver for receiving a second image frame of the video sequence; generating a second skin model and a second non-skin model via the controller based on the second image frame; determining a second discriminative skin likelihood function via the likelihood unit based on the second skin model and the second non-skin model; and classifying second individual pixels of the second image frame via the classifier unit based on the second discriminative skin likelihood function to generate second skin label data associated with the second image frame. Optionally, the controller is to receive the second image frame after the individual pixels of the image are classified.

Example 43 includes the apparatus of any one of examples 38 to 42, including or excluding optional features. In this example, the skin label data further comprises, for each of the individual pixels, a classification confidence value.

Example 44 includes the apparatus of any one of examples 38 to 43, including or excluding optional features. In this example, the apparatus includes determining a minimum bounding box based on a plurality of facial feature landmarks and means for expanding the minimum bounding box to generate the skin dominant region.

Example 45 includes the apparatus of any one of examples 38 to 44, including or excluding optional features. In this example, the image is associated with image data in a color space comprising at least one of a red green blue color space, a luminance chroma color space, a luminance blue difference red difference color space, or a hue saturation value color space. Optionally, the color space comprises a red, green, blue color space and wherein the skin model is based on red and green channels of the red, green, blue color space.

Example 46 includes the apparatus of any one of examples 38 to 45, including or excluding optional features. In this example, the apparatus includes generating a second skin model based on a second skin dominant region of the image via the controller; and determining a second discriminative skin likelihood function based on the second skin model and the second non-skin model via the likelihood unit, wherein the means for classifying the individual pixels are further to classify the individual pixels as first skin pixels associated with the skin dominant region or second skin pixels associated with the second skin dominant region.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for performing single Gaussian skin detection, comprising:
   a memory configured to receive image data; and
   a processor coupled to the memory, the processor to:
   generate a single Gaussian skin model based on a skin dominant region associated with the image data and a single Gaussian non-skin model based on a second region associated with the image data; and
   classify individual pixels associated with the image data via a discriminative skin likelihood function based on the single Gaussian skin model and the single Gaussian non-skin model to generate skin label data associated with the image data.

2. The system of claim 1, wherein classifying individual pixels comprises comparing a skin classification value for a first individual pixel to a predetermined threshold value.

3. The system of claim 1, wherein the discriminative skin likelihood function comprises at least one of a log-based classifier, a thresholding function, a Bayesian classifier, a Gaussian classifier, a multi-layer perceptron classifier, or a neural network classifier.

4. The system of claim 1, wherein the image data comprises an image frame of a video sequence, and wherein the processor to generate the skin model and the non-skin model and to classify the individual pixels comprises the processor to generate the skin model and the non-skin model and to classify the individual pixels online with respect to the video sequence.

5. The system of claim 1, wherein the image data comprises an image frame of a video sequence and the processor is further to receive second image data associated with a second image frame of the video sequence, to generate a second skin model and a second non-skin model based on the second image frame, and to classify second individual pixels associated with the second image data via a second discriminative skin likelihood function based on the second skin model and the second non-skin model to generate second skin label data associated with the second image data.

6. The system of claim 1, wherein the skin label data further comprises, for each of the individual pixels, a classification confidence value.

7. The system of claim 1, wherein the processor is further to determine a minimum bounding box based on a plurality of facial feature landmarks and to expand the minimum bounding box to generate the skin dominant region.

8. The system of claim 1, wherein the image data is in a color space comprising at least one of a red green blue color space, a luminance chroma color space, a luminance blue difference red difference color space, or a hue saturation value color space.

9. The system of claim 1, wherein the processor is further to generate a second skin model based on a second skin dominant region associated with the image data and wherein the processor to classify the individual pixels associated with the image data further comprises the processor to classify the individual pixels as first skin pixels associated with the skin dominant region or second skin pixels associated with the second skin dominant region.

10. A method for performing skin detection, comprising:
    generating a single Gaussian skin model based on a skin dominant region of an image and a single Gaussian non-skin model based on a second region of the image;
    determining a discriminative skin likelihood function based on the a single Gaussian skin model and the single Gaussian non-skin model; and
    classifying individual pixels of the image as skin pixels or non-skin pixels based on the discriminative skin likelihood function to generate skin label data associated with the image.

11. The method of claim 10, wherein classifying individual pixels comprises comparing a skin classification value for a first individual pixel to a predetermined threshold value.

12. The method of claim 10, wherein the discriminative skin likelihood function comprises at least one of a log-based classifier, a thresholding function, a Bayesian classifier, a Gaussian classifier, a multi-layer perceptron classifier, or a neural network classifier.

13. The method of claim 10, wherein the image comprises an image frame of a video sequence, and wherein generating the skin model and the non-skin model, determining the discriminative skin likelihood function, and classifying the individual pixels are performed online during processing of the video sequence.

14. The method of claim 10, wherein the image comprises an image frame of a video sequence, the method further comprising:
    receiving a second image frame of the video sequence;
    generating a second skin model and a second non-skin model based on the second image frame;
    determining a second discriminative skin likelihood function based on the second skin model and the second non-skin model; and
    classifying second individual pixels of the second image frame based on the second discriminative skin likelihood function to generate second skin label data associated with the second image frame.

15. At least one non-transitory machine readable medium comprising a plurality of instructions that, in response to being executed on a computing device, cause the computing device to perform skin detection by:
    generating a single Gaussian skin model based on a skin dominant region of an image and a single Gaussian non-skin model based on a second region of the image;
    determining a discriminative skin likelihood function based on the single Gaussian skin model and the single Gaussian non-skin model; and classifying individual pixels of the image as skin pixels or non-skin pixels based on the discriminative skin likelihood function to generate skin label data associated with the image.

16. The non-transitory machine readable medium of claim 15, wherein classifying individual pixels comprises comparing a skin classification value for a first individual pixel to a predetermined threshold value.

17. The non-transitory machine readable medium of claim 15, wherein the discriminative skin likelihood function comprises at least one of a log-based classifier, a thresholding function, a Bayesian classifier, a Gaussian classifier, a multi-layer perceptron classifier, or a neural network classifier.

18. The non-transitory machine readable medium of claim 15, wherein the image comprises an image frame of a video sequence, and wherein generating the skin model and the non-skin model, determining the discriminative skin likelihood function, and classifying the individual pixels are performed online during processing of the video sequence.

19. The non-transitory machine readable medium of claim 15, further comprising instructions that, in response to being executed on the computing device, cause the computing device to perform skin detection by:
    determining a minimum bounding box based on a plurality of facial feature landmarks and expanding the minimum bounding box to generate the skin dominant region.

20. An apparatus for performing skin detection comprising:
    a controller for generating a single Gaussian skin model based on a skin dominant region of an image and a single Gaussian non-skin model based on a second region of the image;
    a likelihood unit for determining a discriminative skin likelihood function based on the single Gaussian skin model and the single Gaussian non-skin model; and
    a classifier unit for classifying individual pixels of the image as skin pixels or non-skin pixels based on the discriminative skin likelihood function to generate skin label data associated with the image.

21. The apparatus of claim 20, wherein the classifier unit compares a skin classification value for a first individual pixel to a predetermined threshold value.

22. The apparatus of claim 20, wherein the discriminative skin likelihood function comprises at least one of a log-based classifier, a thresholding function, a Bayesian classifier, a Gaussian classifier, a multi-layer perceptron classifier, or a neural network classifier.

23. The apparatus of claim 20, wherein the image comprises an image frame of a video sequence, and wherein the means for generating the skin model and the non-skin model, the means for determining the discriminative skin likelihood function, and the means for classifying the individual pixels are to operate online with respect to the video sequence.

24. The apparatus of claim 20, wherein the image comprises an image frame of a video sequence, the apparatus further comprising:
    a receiver for receiving a second image frame of the video sequence;
    generating a second skin model and a second non-skin model via the controller based on the second image frame;
    determining a second discriminative skin likelihood function via the likelihood unit based on the second skin model and the second non-skin model; and
    classifying second individual pixels of the second image frame via the classifier unit based on the second discriminative skin likelihood function to generate second skin label data associated with the second image frame.

25. The apparatus of claim 20, wherein the skin label data further comprises, for each of the individual pixels, a classification confidence value.

\* \* \* \* \*